INFRARED SPECTRUM OF $N_2F^+AsF_6^-$ FILM ON AgCl

INVENTORS
DAVID MOY
ARCHIE R. YOUNG

AGENT

F¹⁹ NMR SPECTRUM OF $N_2FAsF_6$ IN ANHYDROUS HF

United States Patent Office 3,449,090
Patented June 10, 1969

3,449,090
POLYFLUOROMETAL SALTS OF
CIS-DIFLUORODIAZINE
David Moy, Andover, and Archie R. Young, Montclair,
N.J., assignors to Thiokol Chemical Corporation, Bristol, Pa., a corporation of Delaware
Filed June 21, 1965, Ser. No. 465,549
Int. Cl. C01b 21/08; C01c 3/16
U.S. Cl. 23—356                                13 Claims

ABSTRACT OF THE DISCLOSURE

Novel stable polyfluorometal salts of cis-difluorodiazine (cis-$N_2F_2$) are prepared by reacting cis-$N_2F_2$ with a corresponding metal fluoride. For example, fluorodiazonium hexafluoroarsenate ($N_2F^+AsF_6^-$) is prepared by reacting cis-$N_2F_2$ with $AsF_5$.

---

Figure 1:
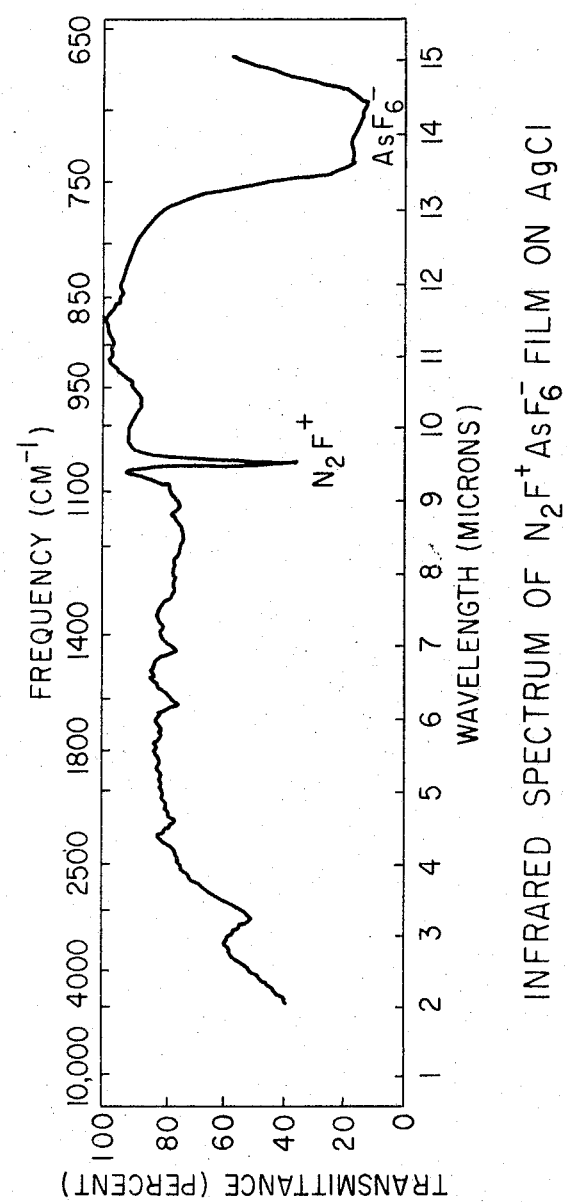

This invention concerns novel stable derivatives of the fluorodiazonium ($N_2F^+$) cation.

More particularly, this invention relates to complex polyfluoro derivatives of the fluorodiazonium ion and to methods for their preparation.

In general, any strong fluoride ion acceptor can potentially react with $N_2F_2$ to form a fluorodiazonium salt within the scope of this invention.

Thyical compositions of this invention which serve to qualitatively illustrate the extent of anionic substitution are: $N_2FBF_4$, $N_2FPF_6$, $N_2FSbF_6$, $N_2FAsF_6$, $N_2FBiF_6$, $N_2FXeF_7$, $N_2FBrF_4$ and $N_2FClF_4$ among many others.

Difluorodiazine ($N_2F_2$) was prepared by Haller in 1942 (Doctoral Dissertation, Cornell University, Ithaca, N.Y.), and although the most intense ion fragment in the mass spectrum of cis-$N_2F_2$ is $N_2F^+$, stable compsitions containing the cation ($N_2F^+$) until the present time have never been prepared. Fluorodiazonium salts are valuable as oxidizing and fluorinating agents for a variety of applications. In addition, the compounds are useful in catalyzing the polymerization of unsaturated fluorocarbons and are valuable intermediates for preparing aromatic fluorine compounds. Further, the compositions of this invention can be used as a source of nitrous oxide if brought into contact with water.

The oxidizing propensities of the compositions of this invention allow thier use as additives or components in solid and liquid bleaches for both industrial and household applications.

As indicated above, the inventive compositions are useful and advantageous reagents. However, they are of particular interest because they represent the first preparation of derivatives of the inorganic fluorodiazonium cation ($N_2F^+$). A further usual aspect of the composition of this invention is that in some instances the compounds are stable in a dry environment up to about 150° C. It had previously been the belief of workers in the field that even if cations containing nitrogen and fluoride could be produced, they would be unstable and transient in nature. For this reason, the preparation of the compositions of this invention was both unusual and unexpected and represents a major advance in organic chemistry.

Thus, it is an object of this invention to prepare the first stable derivatives of the fluorodiazonium cation.

It is another object of this invention to prepare a novel and potent group of oxidizing agents.

Yet another object of this invention is to prepare a new class of polymerization catalysts.

An additional object is the preparation of previously unavailable intermediates for preparing organic and inorganic fluorides.

Further objects of this invention are the preparation of a new class of reagents useful as a source of pure nitrous oxide and the development of novel processes for preparing anions of $N_2F^+$ generally.

Many other objects will become apparent to those skilled in the art after a further reading of this patent application.

The above objects, among many others, are achieved by the processes described below:

In the preferred practice, a thermally stable derivative such as $N_2F^+AsF_6$, $N_2F^+SbF_6$, or $N_2F^+BiF_6$ is formed by reacting cis-difluorodiazine ($N_2F_2$) with a binary fluoride such as $AsF_5$, $BiF_5$ below room temperature or somewhat above room temperature, until the fluorodiazonium derivative is formed. Purification is conveniently effected by pumping the white solid product under a strong vacuum for several hours or alternatively by sublimation.

The preferred "direct" reaction between cis-$N_2F_2$ and $AsF_5$, $SbF_5$, $BiF_5$ can be extended to many other metallic or metalloid reactants. However, in some instances the direct reaction requires very high pressure and/or high temperatures. For instance, the preparation of $N_2FPF_6$ and $N_2FBF_4$ requires conditions of high pressures. Since these conditions require costly and special reaction equipment and are somewhat hazardous, it is preferred to use an indirect means of synthesis.

For these reasons, a second indirect process is favored for preparing other more recalcitrant fluorodiazonium derivatives. In the preferred aspect of this process, the stable fluorodiazonium hexafluoroarsenate ($N_2F^+AsF_6^-$), fluorodiazonium hexafluorobismuthate ($N_2F^+BiF_6^-$) or fluorodiazonium hexafluoroantimonate ($N_2F^+SbF_6^-$) is contacted with an alkali metal polyfluoride such as $NaBF_4$, $NaPF_6$, $NaClF_4$, $NaBiF_6$ among others, preferably in the presence of a solubilizing solvent that is inert to the reactants, until the desired product is formed. The product and by-products are separated by their different solubilities and purification can be effected among other ways by recrystallization. Volatiles are removed by vacuum distillation.

Among the solvents which can be used for either of the two processes are the following: HF, $IF_5$, HF-$IF_5$ mixtures.

To better indicate the scope of the preparative reactions, the following embodiments are described.

In one embodiment, equimolar quantities of xenon hexafluoride and cis-$N_2F_2$ are condensed into a reaction tube kept at −196° C. The reaction mixture is allowed to come to room temperature and remains there for 16 hours. The product is isolated by evacuating under strong vacuum for 6 hours. The solid's identity as $N_2F^+XeF_7$ is confirmed by infrared analysis.

In a related embodiment of this invention, 4 millimoles of cis-$N_2F_2$ and 4 millimoles of $SbF_5$ are condensed at −196° C. and placed in a pressurized bomb. The bomb is sealed and the bomb is heated to 70° C. for 3 hours. At the end of this time, the bomb is chilled, vented off and opened. An off-white solid product is obtained which is pumped under vacuum for 6 hours to remove traces of volatile impurities. The product is removed from the bomb under a dry nitrogen atmosphere and is stored under nitrogen in vials. Elemental and infrared analyses indicate that the desired $N_2FSbF_6$ product is obtained.

In another embodiment, 2 millimoles of cis-$N_2F_2$ and 1 millimole of $BiF_5$ are combined at −196° C. and placed in a pressurized bomb. The bomb is sealed and heated to 100° C. for 10 hours. At the end of this time, the heating is discontinued, the bomb chilled, vented off and opened. An off-white solid product is obtained. The product is pumped under strong vacuum for 5–6 hours and the product stored under nitrogen. Elemental and infrared analyses confirm that the desired product, $N_2FBiF_6$, has been formed.

Preparations of $N_2FBF_4$ and $N_2FPF_6$ can be made under superatmospheric pressure conditions but for the reasons described supra are not favored.

The following embodiments are illustrative of the indirect process of preparation using $N_2FAsF_6$ as a reactant.

In one embodiment, $N_2FAsF_6$ (5 millimoles) is contacted with 5 millimoles of $NaBiF_6$ in the presence of 25 parts by weight of anhydrous HF. After 3 hours of stirring, the solute of the reaction mixture is decanted off and the precipitate of the $NaAsF_6$ is discarded. The solute containing product is pumped under strong vacuum to strip off the HF solvent. Infrared and elemental analyses indicate that the product is identical to that obtained through the direct reaction of cis-$N_2F_2$ and $BiF_5$.

In another embodiment, 6 millimoles of $N_2FAsF_6$ is reacted with 6 millimoles of $NaPF_6$ in the presence of 15 parts by weight of $IF_5$ solvent at 15° C. After 2½ hours of stirring, the solute of the reaction mixture is decanted off to remove the precipitated $NaAsF_6$. The filtrate containing product and solvent is evaporated down to solid residue by evacuating under high vacuum and is recovered as solid product. Analytical data indicates that the desired $N_2FPF_6$ is produced.

In a related embodiment, a 3 millimole portion of $N_2FAsF_6$ is contacted with 3 millimoles of $NaClF_4$ in the presence of 10 ml. of anhydrous HF. The reactants are stirred together for 5 hours, then the reaction mixture is decanted off to obtain the solute containing product. The HF solvent is stripped off as before under vacuum. The identity of the product as $N_2F^+ClF_4^-$ is confirmed by analytical data.

In another embodiment, $N_2F^+BrF_4^-$ is prepared by contacting a stirred solution of 2 millimoles of $N_2FAsF_6$ with 2 millimoles of $NaBrF_4$ in 5 ml. of anhydrous HF for 4 hours. The reaction solution is decanted and stripped of solvents and volatiles as before. Analyses confirm that the desired $N_2FBrF_4$ product is obtained.

As indicated by the illustrative process embodiments described above, there is considerable latitude insofar as reaction conditions and reactants and the ratio of reactants are concerned. For example, while the reaction is preferably run at temperatures not substantially above room temperature, under pressurized conditions or under the short reaction times that prevail in shock tube reactions, much higher temperatures can be used. Lower temperatures can be used when convenient. Under the conditions of temperatures and pressure of the favored $N_2F_2$ reaction with polyfluorides, the reaction is substantially completed within 8 hours of the time the reactants are brought into contact with each other.

The ratio of the two reactants is not critical to the operability of the process. Higher or lower ratios of the reactants do not appear to affect operability. However, difficult separation problems arise if other than 1:1 ratios of the reactants are used in the indirect process. In the case of the preparation of the favored $N_2FAsF_6$ product, the product appears to form in a 1:1 ratio of the two reactants no matter what reactant is in excess.

The novel fluorodiazonium salts of this invention are generally white or off-white solids at room temperature. The fluorodiazonium hexafluoroarsenate product is the preferred product since its good stability enables its use as a starting material for making many other products by the indirect process.

In the direct process, solvent need not be used when the reactants are both gaseous. In the indirect process and where the second reactant in the direct process is a liquid or solid, an inert solvent which can solubilize the reactants is preferred. Anhydrous HF, $IF_5$ and mixtures of these solvents, among others, can be used as solvents.

The cis-$N_2F_2$ reactant formerly was a commercially available chemical from Air Products, Inc., Allentown, Pa., but now must be synthesized using the procedure described in the literature.

The P, As, Sb, and Bi pentafluorides are chemicals of commerce. The other polyfluorides can be obtained commercially upon special order or can be synthesized using the methods described by various authors in the textbook entitled "Fluorine Chemistry," Volume I, edited by D. J. H. Simons and published in 1950 by Academic Press, Inc., New York, N.Y. Other methods of preparation are described in the technical and patent literature including "Chemical Abstracts."

To show the invention in its preferred embodiment in the greatest possible detail, the following example and tables showing the preparation and analytical evidence for $N_2FAsF_6$ is submitted.

EXAMPLE I (A) Preparation of $N_2F \cdot AsF_6$

Quantities of commercially obtained cis-difluorodiazine and arsenic pentafluoride are measured separately in a one-liter Monel bulb and then condensed into a Kel-F or glass reaction tube at −196° C. The tube is allowed to warm to room temperature, and after 1-2 hours, the residual pressure in the tube is measured and gas samples were taken for infrared analysis. The white solid product is pumped for several hours to remove traces of volatile impurities ($SiF_4$, $BF_3$), and trans-$N_2F_2$). The product is removed from the reaction tube in a dry nitrogen atmosphere box and stored under nitrogen in Kel-F vials.

Under the same conditions, trans-difluorodiazine did not react with arsenic pentafluoride.

(B) Analysis of $N_2F^+ \cdot AsF_6$ (1) Elemental analysis.—Independent N, F, and As analyses are performed on the solid product with the following results:

Analysis.—Calcd. for $N_2FAsF_6$: N, 11.88; F, 56.36; As, 31.76. Found: N, 11.83; F, 56.79; As, 31.59.

(2) Mass spectrum.—A Monel tube containing a small sample of the adduct is attached to a Bendix-Time-of-Flight mass spectrometer (Model 12–101), evacuated and heated to 150° C. The cracking pattern obtained is presented in Table II.

(3) Hydrolytic decomposition.—Two samples, 0.172 g. and 0.269 g., of the solid adduct produced 0.67 millimole nitrous oxide (theory for $N_2F_2 \cdot AsF_5$, 0.73 millimole) and 1.12 mole nitrous oxide (theory for $N_2F_2 \cdot AsF_5$, 1.14 mole) respectively on reaction with water in a closed Kel–F tube. $N_2O$ can be distilled from the reaction tube at −80° C. and identified by its infrared spectrum.

(C) Reaction with sodium fluoride in hydrogen fluoride

Anhydrous HF is obtained by reacting water-contaminated HF with the solid product until $N_2O$ was no longer evolved. The anhydrous HF is then distilled onto a fresh sample of the adduct. The adduct dissolved readily above 0° C., and could be recovered unchanged upon removal of the HF.

Excess NaF is added to a solution of 0.205 g. of the solid adduct in HF. The reactor is cooled to −80° C., and 0.85 millimole of gas is distilled out of the reactor. On the basis of its infrared spectrum, the gas is estimated to be 95+% or 0.81 millimole cis-$N_2F_2 \cdot AsF_5$ (theoretical $N_2F_2$ for $N_2FAsF_6$, 0.87 millimole), the balance being $N_2O$.

(D) Characterization of $N_2F^+ \cdot AsF_6$ (1) Infrared spectrum.—A conventional low temperature infrared cell constructed of Pyrex with an internal silver chloride plate supported on a hollow copper block is used to obtain a spectrum of cis-$N_2F_2 \cdot AsF_5$. This spectrum is designated as FIGURE 1. Arsenic pentafluoride and cis-difluorodiazine are condensed onto the silver chloride plate at −196° C. The cell was pumped as the plate warmed to room temperature. A thin film of solid remaining on the plate at room temperature is the sample. The sample is scanned on a Perkins-Elmer Model 21 spectrometer from 2–15μ.

Figure 2:
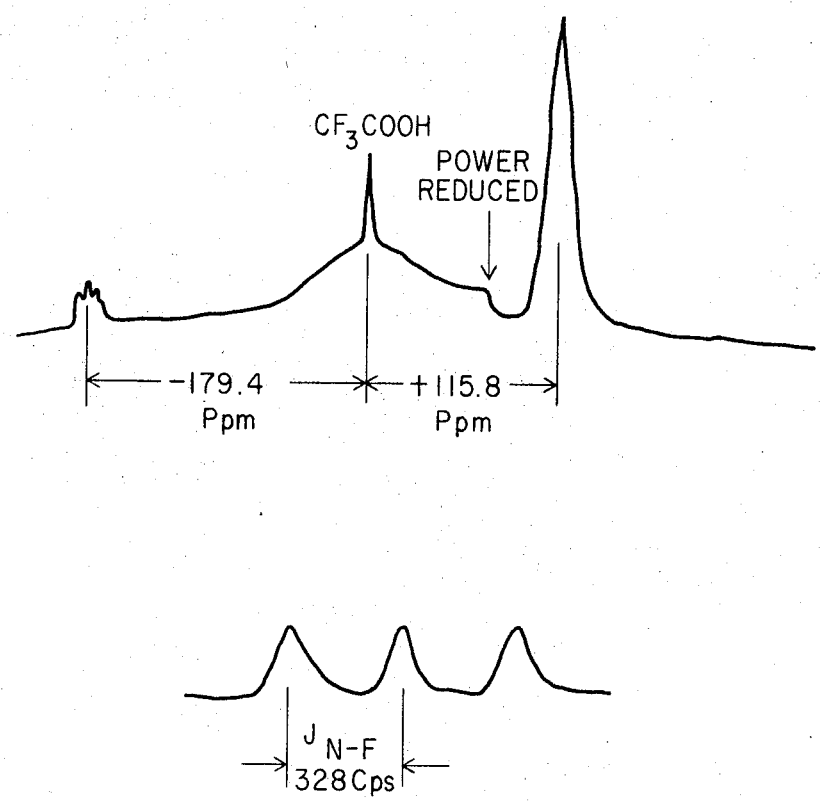

(2) F¹⁹ nuclear magnetic resonance spectrum.—The F¹⁹ NMR spectrum of a solution of the adduct in anhydrous HF (approximately 40% solution) is obtained on a Varian HR–60 spectrometer at room temperature. This spectrum is designated FIGURE 2. Trifluoroacetic acid (TFA) is used as an external reference. Approximate chemical shifts (uncorrected for bulk susceptibility effects) and N–F coupling constants are obtained from the location of TFA side bands with an accuracy of ±10 c.p.s. A Teflon tube (6 in. x 0.5 in.) fitted to a valve and ball joint by means of Swagelok connections is used as a simple tube. A sealed Kel–F capillary containing TFA is inserted directly into the sample tube.

(3) Powder diffraction pattern.—Powder diffraction patterns are obtained on samples of the product from separate preparative runs and on samples recovered from HF solutions. All the patterns are identical. The patterns were photographed with CuK$_a$ ° C. radiation from a nickel filter. The X-ray samples are sealed under nitrogen in Pyrex capillaries.

(4) Density.—The density of a perfluorinated ether, FC–75 [1], with which the adduct is compatible, is determined to be 1.77 g./ml. at 25° C. The density of the solid adduct at 25° C. is determined to be 2.6 g./ml. by displacement of FC–75.

DISCUSSION OF RESULTS

Stoichiometry of solid adduct

The data presented in Table I confirms that arsenic pentafluoride and cis-difluorodiazine react in a 1:1 mole ratio as indicated by Equation 1.

$$\text{cis-}N_2F_2 + AsF_5 \rightarrow N_2F_2 \cdot AsF_5 \quad (1)$$

TABLE I.—PREPARATION OF $N_2F \cdot AsF_6$

| Initial Reagents | | Volatile Products Recovered (millimole) |
|---|---|---|
| $N_2F_2$ (millimole) | $AsF_5$ (millimole) | |
| 1.0 | 1.0 | <0.2 {trans-$N_2F_2$, $SiF_4$, $BF_3$} |
| 2.0 | 1.0 | ~1.0 {cis-$N_2F_2$, trans-$N_2F_2$, $SiF_4$, $BF_3$} |
| 1.0 | 2.0 | ~1.0 {$AsF_5$, trans-$N_2F_2$, $SiF_4$, $BF_3$} |

The only gases recovered when equimolar quantities of the reagents were mixed, were $SiF_4$, $BF_3$, and trans-$N_2F_2$, all of which were present initially as impurities. The use of an excess of either reagent resulted in the quantitative recovery of that portion of reagent in excess of the equimolar amount. The results of separate fluorine, arsenic, and nitrogen analyses substantiate the 1:1 stoichiometry.

In addition to the elemental analyses and preparative data, the stoichiometry of the solid adduct can be inferred from the results obtained on reacting it with water and with sodium fluoride. The reaction with water consistently produced quantities of nitrous oxide in excellent agreement with the theoretical quantities predicted by Equation 2.

$$N_2F_2 \cdot AsF_5 + H_2O \rightarrow N_2O + HF + HAsF_6 \quad (2)$$

The reaction with sodium fluoride in hydrogen fluoride also serves to confirm the 1:1 stoichiometry. The total nitrogen recovered as cis-difluorodiazine and nitrous oxide

[1] Trade name, Minnesota Mining & Manufacturing Company.

is in excess of 98% of the theoretical quantities predicted by Equation 3.

$$N_2F_2 \cdot AsF_5 + NaF \xrightarrow{HF} \text{cis-}N_2F_2 + NaAsF_6 \quad (3)$$

The presence of a small amount of water in the sodium fluoride is believed to account for the nitrous oxide formation via the reaction shown in Equation 2.

The mass spectrum at 150° C. (Table II) shows only peaks that would arise from a mixture of cis- and trans-difluorodizine and arsenic pentafluoride. Ion fragments with elements other than nitrogen, fluorine and arsenic were not found.

TABLE II.—MASS SPECTRUM $N_2F_2 \cdot AsF_4$ AT 150° C.

| M/e | Ion | Relative Intensity |
|---|---|---|
| 19 | F⁺ | 8.0 |
| 28 | $N_2^+$ | 93.0 |
| 33 | NF⁺ | 5.2 |
| 47 | $N_2F^+$ | 93.0 |
| 66 | $N_2F_2^+$ | 3.1 |
| 75 | As⁺ | 6.0 |
| 94 | AsF⁺ | 6.2 |
| 113 | $AsF_2^+$ | 8.6 |
| 132 | $AsF_3^+$ | 14.2 |
| 151 | $AsF_4^+$ | 100.0 |

Properties of fluorodiazonium hexafluoroarsenate

The fluorodiazonium salt is a white solid that decomposes without melting at 150° C. under a dry nitrogen atmosphere. Its density at 25° C. is 2.6 gm./cc. The salt can be sublimed in vacuo at 75° C. and is stable in glass, Kel–F, or metal systems. It is very soluble and stable in anhydrous hydrogen fluoride at room temperature, but is rapidly decomposed by water, arsenic trifluoride, chlorine trifluoride, bromine trifluoride, trifluoroacetonitrile, and perfluoroacetic anhydride.

As the above example and the several illustrative embodiments indicate, numerous changes in reaction conditions and reactants can be made without departing from the inventive concept. The metes and bounds of this invention can best be seen by the claims which follow.

We claim:
1. A compound of the group consisting of fluorodiazonium hexafluoroarsenate, fluorodiazonium hexafluorobismuthate, fluorodiazonium hexafluoroantimonate, and fluorodiazonium hexafluorophosphate.

2. Fluorodiazonium hexafluoroarsenate.

3. The method for preparing a fluorodiazonium salt which comprises reacting cis-difluorodiazine with a binary fluoride selected from $AsF_5$, $SbF_5$, $BiF_5$, $XeF_5$, $PF_5$, and $BF_3$ at a temperature in the range between about −196° and 100° C. at a superatmospheric pressure and recovering the fluorodiazonium salt of said binary fluoride as product.

4. The method of claim 3 wherein the binary fluoride is $AsF_5$ and the product is fluorodiazonium hexafluoroarsenate.

5. The method of claim 3 wherein the binary fluoride is $XeF_5$ and the product is $N_2FXeF_6$.

6. The method of claim 3 including subjecting the product to vacuum conditions for a period of time adequate to remove volatile impurities.

7. The method for preparing a fluorodiazonium salt which comprises reaction a fluorodiazonium salt selected from fluorodiazonium hexafluoroarsenate, fluorodiazonium hexafluorobismuthate and fluorodiazonium hexafluoroantimonate with an alkali metal polyfluoride selected from $NaBF_4$, $NaPF_6$, $NaClF_4$, $NaBrF_4$ and $NaBiF_6$ in a solvent selected from anhydrous HF, $IF_5$ and mixtures thereof at a temperature above the freezing point and below the boiling point of the solvent at atmospheric to superatmospheric pressures and recovering the fluorodiazonium salt of said alkali metal polyfluoride as product.

8. The method of claim 7 wherein the fluorodiazonium salt is fluorodiazonium hexafluoroarsenate.

9. The method of claim 8 wherein the alkali metal polyfluoride is $NaBiF_6$.

10. The method of claim 8 wherein the alkali metal polyfluoride is $NaPF_6$.

11. The method is claim 8 wherein the alkali metal polyfluoride is $NaBF_4$ and the product is $N_2FBF_5$.

12. The method of claim 8 wherein the alkali metal polyfluoride is $NaClF_4$ and the product is $N_2FClF_5$.

13. The method of claim 8 wherein the alkali metal polyfluoride is $NaBrF_4$ and the product is $N_2FBrF_4$.

References Cited
UNITED STATES PATENTS

OSCAR R. VERTIZ, *Primary Examiner.*
C. O. PETERS, *Assistant Examiner.*

U.S. Cl. X.R.

23—367